United States Patent [19]
Higa

[11] Patent Number: 5,844,648
[45] Date of Patent: Dec. 1, 1998

[54] PLASTIC FILM BASED LIQUID CRYSTAL DISPLAY ELEMENT

[75] Inventor: Masakatsu Higa, Atsugi, Japan

[73] Assignee: Ricoh Company, Ltd., Tokyo, Japan

[21] Appl. No.: 923,401

[22] Filed: Sep. 4, 1997

Related U.S. Application Data

[63] Continuation of Ser. No. 395,912, Feb. 28, 1995, abandoned, which is a continuation of Ser. No. 291,889, Aug. 17, 1994, abandoned.

[30] Foreign Application Priority Data

Aug. 17, 1993 [JP] Japan .................................. 5-225194

[51] Int. Cl.⁶ .................................. G02F 1/1335
[52] U.S. Cl. .................................. 349/117; 349/158
[58] Field of Search .................. 359/82, 73, 62, 359/63, 74, 79; 349/158, 117, 84

[56] References Cited

U.S. PATENT DOCUMENTS

| | | | |
|---|---|---|---|
| 4,544,583 | 10/1985 | Claussen et al. | 359/82 |
| 4,561,724 | 12/1985 | Otaki et al. | 359/82 |
| 4,620,772 | 11/1986 | Sugimoto et al. | 359/82 |
| 4,643,531 | 2/1987 | Inoue | 359/82 |

FOREIGN PATENT DOCUMENTS

| | | | |
|---|---|---|---|
| 58-184930 | 10/1983 | Japan | 359/82 |
| 59-224826 | 12/1984 | Japan | 359/82 |
| 60-26931 | 2/1985 | Japan | 359/82 |
| 60-146222 | 8/1985 | Japan | 359/82 |

*Primary Examiner*—William L. Sikes
*Assistant Examiner*—James Dudek
*Attorney, Agent, or Firm*—Oblon, Spivak, McClelland, Maier & Neustadt, P.C.

[57] ABSTRACT

An STN-type liquid crystal display element employing a couple of plastic films having transparent electrodes and alignment films formed thereon as a substrate is described.

16 Claims, 7 Drawing Sheets

PLASTIC FILM BASED LIQUID CRYSTAL DISPLAY ELEMENT

This application is a continuation of application Ser. No. 08/395,912, filed on Feb. 28, 1995, now abandoned, which is a continuation of Ser. No. 08/291,889, filed on Aug. 17, 1994, now abandoned.

BACKGROUND OF THE INVENTION

1. Field of the Invention

The present invention relates to a super twisted nematic-type (STN-type) liquid crystal display element employing a plastic film as the substrate thereof. More particularly, the present invention relates to an STN-type liquid crystal display element employing a plastic film substrate whose retardation delayed-phase axis direction varies in the surface of the substrate.

2. Discussion of the Background

Super twisted nematic-type liquid crystal displays, in which the nematic liquid crystal is twisted by more than 90 degrees, are superior to Twisted Nematic-type liquid crystal display elements in both display capacity and display quality. As a result, STN-type display elements have been widely adopted as the display means for personal computers, word processors, etc.

STN-type liquid crystal display elements utilize a complex liquid crystal refraction effect. Consequently, color-affixing occurs on a background area or on the display area. In such situations, the color of an image is achromatized by combining color compensating phase-difference films. Such STN-type liquid crystal display elements improve image recognizability.

As an alternative to conventional glass substrates for liquid crystal display elements, elements employing plastic films as substrates have recently been popularized. Plastic substrates provide light weight, free bending, and ruggedness. Small-sized TN-type liquid crystal display elements have been partly put to practical use.

STN-type liquid crystal display elements employing a plastic film instead of a glass substrate use a non-axis plastic film having no retardation or a plastic film having constant delayed-phase axis direction (direction of maximum refraction factor) for color compensation and desired retardation value in the range of 100–800 nm. When a film of constant axis direction like a one-axis-elongated film is used, even though the magnitude of the retardation is uniform, the color-affixing due to the substrate retardation is eliminated by constructing the film so as to let the film's axis direction coincide with the absorbing axis direction or to make the former direction perpendicular to the latter direction, for instance, as described in the published specification of Japanese Laid-open Patent Publication No. 61-100726/1986.

In the above-mentioned situation, a plastic film differs from a glass substrate. Namely, in the former case, the complex refraction occurs due to the orientation, etc. of the polymer molecules at the time of manufacturing the film, and thereby retardation easily obtains.

For instance, a non-elongated plastic film is apt to cause complex refraction due to variations in manufacturing or in the environmental conditions. Retardation of at least 10 nm–50 nm are possible. Further, usually, both the retardation value and the delayed-phase axis direction vary in the substrate surface. At present, it is impossible to make the retardation of the plastic film small, as is the case with a glass substrate.

Furthermore, there exist other methods of employing the above one-axis-elongated film in order to provide a phase-difference film for compensating color. However, since it is required to keep constant the magnitude of the retardation and the delayed-phase axis direction at their respective desired values and to improve the heat-proofness, the solution-proofness, and the gas barrier characteristics (gas-proofness), a plastic film substrate serving a color compensation role and having uniform retardation has not yet been put to practical use at present.

Consequently, in utilizing a plastic film instead of a glass substrate as the substrate for in an STN-type liquid crystal display element the unevenesses of the substrate's retardation magnitude and the delayed-phase axis direction have caused deterioration of the display quality, such as unevenness of the contrast and brightness between the manufactured liquid crystal display elements, color-nonuniformity at the surface of the liquid crystal display element, etc.

SUMMARY OF THE INVENTION

The present invention has been made in consideration of the above-mentioned circumstances.

It is thus an object of the present invention to solve the aforementioned problems and provide an STN-type liquid crystal display (LCD) with excellent viewing characteristics.

It is another object of the present invention to provide an STN-type liquid crystal display element employing a plastic film as a substrate.

It is still another object of the present invention to provide an STN-type liquid crystal display element having excellent display quality, even when a plastic film is utilized as a substrate in which the delayed-phase axis direction of the retardation varies in the substrate surface.

It is still another object of the. present invention to provide a high quality STN-type liquid crystal display element which can be mass-produced with high efficiency.

It is still another object of the present invention to provide an STN-type liquid crystal display element having the above-mentioned characteristics and which is thin and light.

DESCRIPTION OF THE PREFERRED EMBODIMENTS

Figure 1:
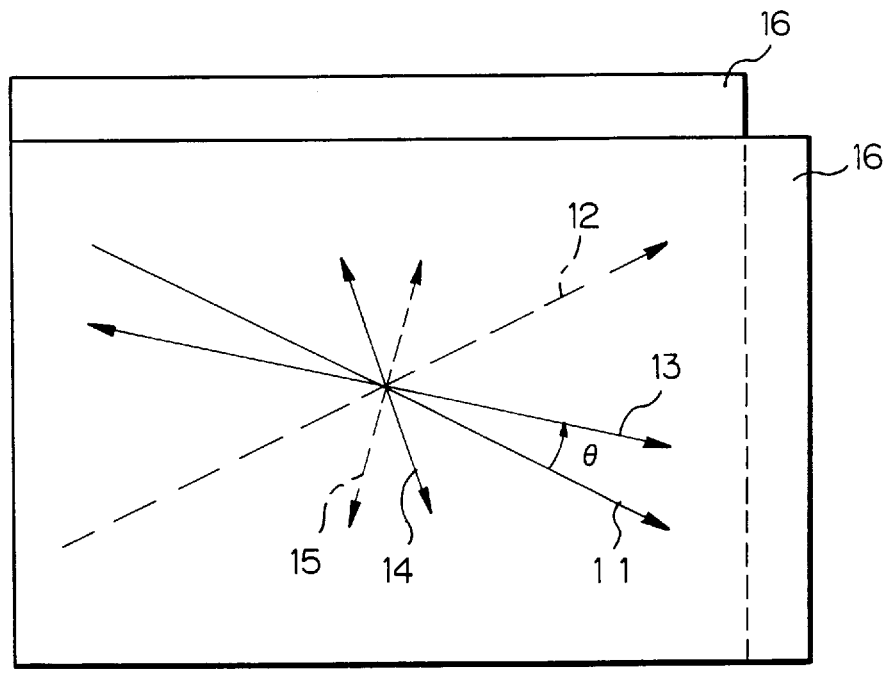
FIG. 1 is a plane view showing the relationship of the directions of the respective factors utilized in the STN-type liquid crystal display elements according to the present invention.

In order to solve the aforementioned problems, the present invention provides an STN-type liquid crystal display element employing a pair of plastic films having transparent electrodes and an alignment film formed thereon as substrates wherein the maximum value of the substrate in the surface of retardation is not more than 50 nm, and further, the delayed-phase axis direction of the substrate's retardation varies in the substrate surface, and the average delayed-phase axis direction of the retardation in the substrate surface is almost parallel with or almost perpendicular to the direction of the orientation of the liquid crystal molecules at the substrate surface.

Furthermore, the present invention liquid crystal display element may be configured such that the value of the product $\Delta n.d$ [wherein $\Delta n$ is the birefringent refraction factor and d is the thickness of the liquid crystal layer] is established as described below:

(1) Assuming that the optimum value of the above product $\Delta n.d$ is equal to $(\Delta n.d)_0$ when there exists no retardation in the substrate, and that both of the magnitudes of the substrate's retardations are respectively set to R1 and R2, where the average delayed-phase axis directions of the substrate's retardations are, respectively, almost parallel with the direction of the liquid crystal molecule's direction of the orientation on the substrate's front surface, the value of the product $\Delta n.d$ is expressed by the following equality;

$$\Delta n.d=(\Delta n.d)_0-R1-R2$$

(2) and, on the other hand, where the average delayed-phase axis directions of the substrate's retardations are, respectively, almost perpendicular to the direction of the liquid crystal molecule's direction of the orientation on the substrate's front surface, the value of the product $\Delta n.d$ is expressed by the following equality;

$$\Delta n.d=(\Delta n.d)_0+R1+R2$$

In the aforementioned construction according to the present invention, the present invention further provides a liquid crystal display element characterized in that the average delayed phase axis direction of the retardation of a substrate in one substrate surface is almost parallel with the direction of the liquid crystal molecule's direction of orientation, while the average delayed-phase axis direction of the retardation of a second substrate in the substrate surface is almost perpendicular to the liquid crystal molecule's direction of the orientation.

Furthermore, in the aforementioned construction according to the present invention, the present invention further provides a liquid crystal display element characterized in that the range of the variation of the substrate's retardation in the direction of the delayed-phase axis is within about 45 degrees in the substrate surface of the liquid crystal display element.

Finally, in the aforementioned construction according to the present invention, the present invention further provides a liquid crystal display element characterized in that the variation width of the substrate's retardation magnitude is not more than 20 nm in the substrate surface of the liquid crystal display element. The construction of the present invention is described in more detail hereinafter.

Figure 2:
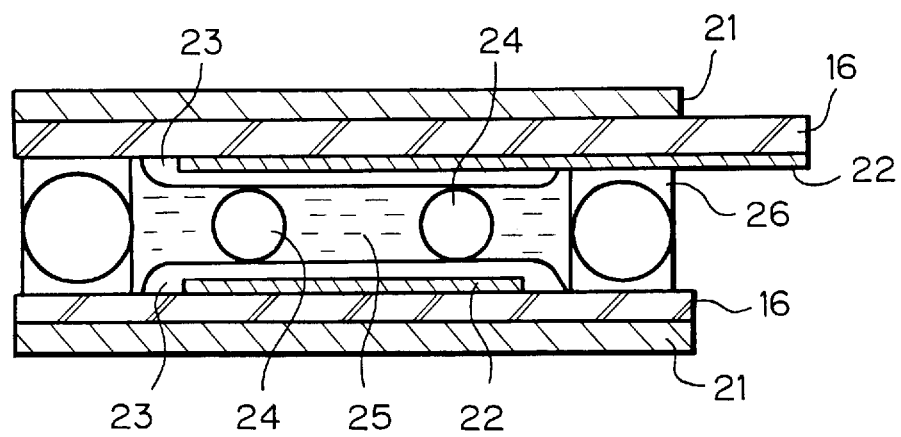
FIG. 2 is a cross-sectional view showing the construction of one example of an STN-type liquid crystal display element according to the present invention.

One example of the present invention STN-type liquid crystal display element in which a couple of plastic films are used as upper and lower substrates, is shown diagrammatically in FIG. 2. FIG. 2 is a cross-sectional view diagrammatically showing the construction of one example of the STN-type liquid crystal display elements according to the present invention. FIG. 1 is a plane view showing the relationship of the directions of the respective factors in the STN-type liquid crystal display elements according to the present invention.

In the liquid crystal display element shown in FIG. 2, a couple of plastic film substrates 16 having a transparent electrode 22 and an alignment film 23 respectively disposed thereon are separately arranged through spacers 24. A layer of the STN-type liquid crystal 25 is formed therebetween. The circumferential portion thereof is sealed by seal 26 so as to construct a liquid crystal cell, and a couple of polarizing plates 21, are disposed respectively at both sides of the liquid crystal cell.

Furthermore, and as shown in FIG. 1, reference numeral 11 represents a rubbing direction of an upper substrate, 12 another rubbing direction of a lower substrate, 13 a delayed-phase axis direction of the upper substrate's retardation, 14 a transmission axis of an upper polarizing plate, 15 another transmission axis of a lower polarizing plate, and 16 a substrate.

As to the upper and lower substrates employed in the liquid crystal display element according to the present invention, the maximum value of the retardation in the substrate surface is not more than 50 nm. The direction of the retardation varies in the substrate surface. The respective parts of the liquid crystal display element are arranged such that the average delayed-phase axis direction of the retardation in the substrate surface becomes almost parallel with or almost perpendicular to the direction of the liquid crystal molecule's orientation on the substrate front surface, for instance, the rubbing direction of the substrate. By the terms "almost perpendicular" or "almost parallel" an error of 50, more preferably 20, most preferably 10, 0.50, 0.10 and 0.050 is meant. Actually perpendicular and actually parallel are included. These errors are also meant wherever the terms almost, about or approximately are used herein in reference to degree measurements. Such degree measurements also include the stated value, of course.

In the present invention, it is preferable to establish the product value $\Delta n.d$ of the birefringent refraction factor $\Delta n$ and the thickness d of the liquid crystal layer as mentioned below. Namely, assuming that the optimum value of the product $\Delta n.d$ is equal to $(\Delta n.d)_0$ when there exists no retardation in the substrate, and both of the magnitudes of the substrate's retardations are respectively set to R1 and R2, in case where the average delayed-phase axis directions of the substrate's retardations are, respectively, almost parallel with the direction of the liquid crystal molecule's orientation on the substrate's front surface, the value of the product $\Delta n.d$ is expressed by the following equality:

$$\Delta n.d=(\Delta n.d)_0-R1-R2$$

On the other hand, where the average delayed-phase axis directions of the substrate's retardations are, respectively, almost perpendicular to the direction of the liquid crystal molecule's orientation on the substrate's front surface, the value of the product $\Delta n.d$ turns out to be the one expressed by the following equality:

$$\Delta n.d=(\Delta n.d)_0-R1-R2$$

Furthermore, in the present invention, the liquid crystal display element may be constructed such that the average delayed-phase axis direction of the substrate's retardation in the substrate surface becomes almost parallel with the direction of the liquid crystal molecule's orientation on the substrate front surface, and the average delayed-phase axis direction of another substrate's retardation in the substrate surface becomes almost perpendicular to the direction of the liquid crystal molecule's orientation on the substrate front surface.

It is desirable that the variation of the substrate's retardation in the delayed-phase axis is not more than about 45 degrees, preferably, not more than 30 degrees. And further, it is desirable that the variation width of the substrate's retardation magnitude is not more than 20 nm, preferably, not more than 10 nm.

While not intending to be bound by a particular theory, what the inventors believe is the fundamental principle of the present invention is explained hereinafter. Assuming that the angle θ is formed by the difference between the delayed-phase axis direction of the substrate's retardation and the direction of the orientation treatment on the inner surface brought into contact with the liquid crystal of the substrate, the fundamental principle will be explained as to a liquid crystal element employing a glass substrate having no retardation and a liquid crystal element employing a plastic film disposed thereon having the retardation on one of its substrate sides, in order to more simply describe the effect of the plastic film substrate's retardation.

Figure 3:
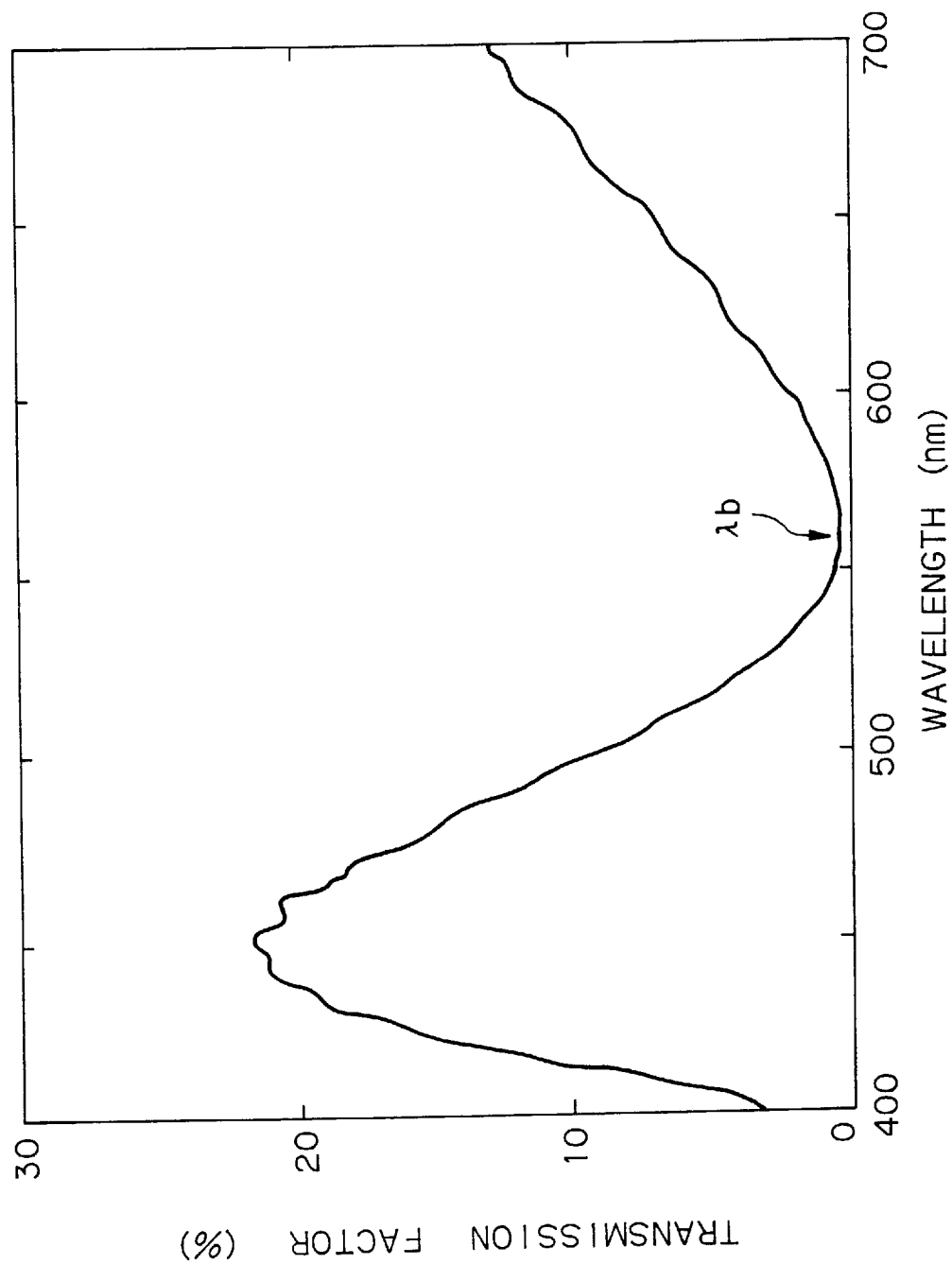
FIG. 3 is a graph showing an example of the light-separating transmission factor of an STN-type liquid crystal display element employing a glass substrate.

FIG. 3 is a graph showing the light-separating transmission factor of an STN-type liquid crystal display element which is manufactured by use of a glass substrate and generally called "blue-mode." As for the above element, the respective values are respectively set as follows; the value Δn.d of the liquid crystal layer is 840 nm, the twist angle of the liquid crystal layer is 240 degrees, and the angle formed by the difference between the direction of the orientation (rubbing treatment direction) of the molecules of the liquid crystal on the substrate and that of the polarizing element is 45 degree.

The relationship of the wavelength $\lambda_b$ for minimizing the light-separating transmission factor, the value Δn.d of the liquid crystal layer, and the twisting angle ω is expressed by the following equality, as described in "Mol. Cryst. Liq. Cryst. Letters. Vol. 4 (6), pp. 159–163 1987)": [Equality-1]

$$\Delta n \cdot d = \lambda_b \sqrt{4 - (\omega/180)^2} \quad (1)$$

Figure 4:
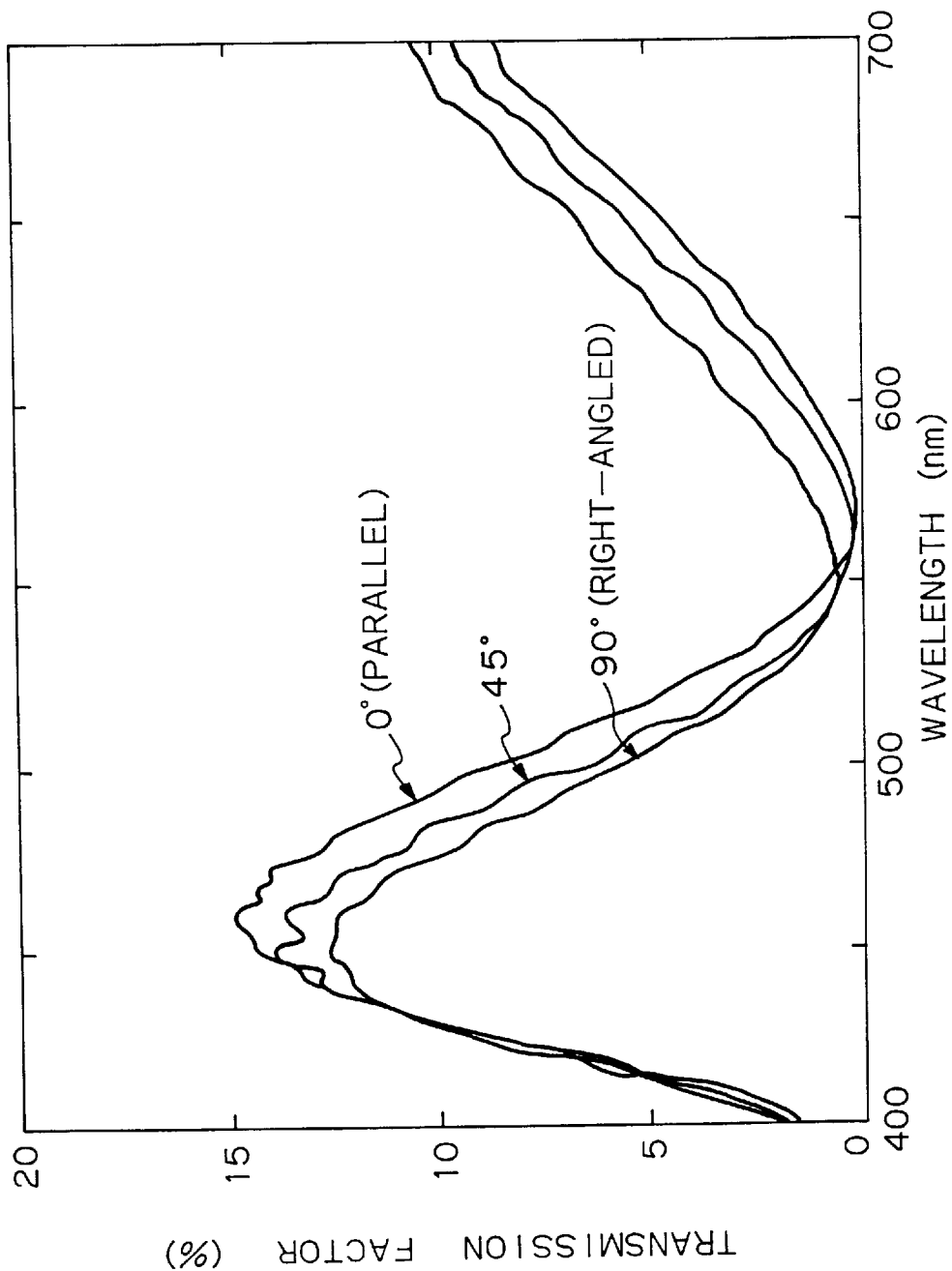
FIG. 4 is a graph showing the light-separating transmission factor of a liquid crystal display element in which polycarbonate film is disposed between the one-side substrate of the liquid crystal display element shown in FIG. 3 and the diffraction element.

FIG. 4 is a diagram showing the relationship between the transmission factor (%) and the wavelength (nm), in which a polycarbonate film having a retardation value of almost 20 nm is disposed between the one-side substrate of the liquid crystal display element and the polarizing element, and the angle (θ) formed by the direction of distributing the liquid crystal molecule and that of the delayed axis of the film's retardation is either one of 0 degrees (parallel), 45 degrees and 90 degrees (perpendicular).

As is apparent from FIG. 4 that the light separating characteristic shifts to the side of longer wavelength when θ is 0 degrees, shifts to the shorter wavelength when θ is 90 degrees, and does not change at all when θ is 45 degree, due to the influence of the film retardation exerted thereon. It is thus possible that the shift of the light-separating characteristic is seemingly the variation of the value Δn.d of the liquid crystal layer. The apparent value Δn.d of the liquid crystal layer can be obtained from $\lambda_b$ at by use of the equality (1). Refer to Table 1 shown below.

TABLE 1

| θ (degree) | 0 | 45 | 90 | No Film |
|---|---|---|---|---|
| $\lambda_b$ (nm) | 570 | 560 | 550 | 560 |
| Δn · d (nm) | 860 | 840 | 820 | 840 |

Referring to Table 1, it is possible to deem that the value Δn.d of the liquid crystal increases or decreases by film's retardation 20 nm in accordance with the direction of the distributing process and that of the film's retardation.

In such a situation, when the retardation of the film is very small compared with the value Δn.d of the liquid crystal layer, it is possible to deem that the influence of the film is seemingly the variation of the value Δn.d of the liquid crystal layer.

Figure 5:
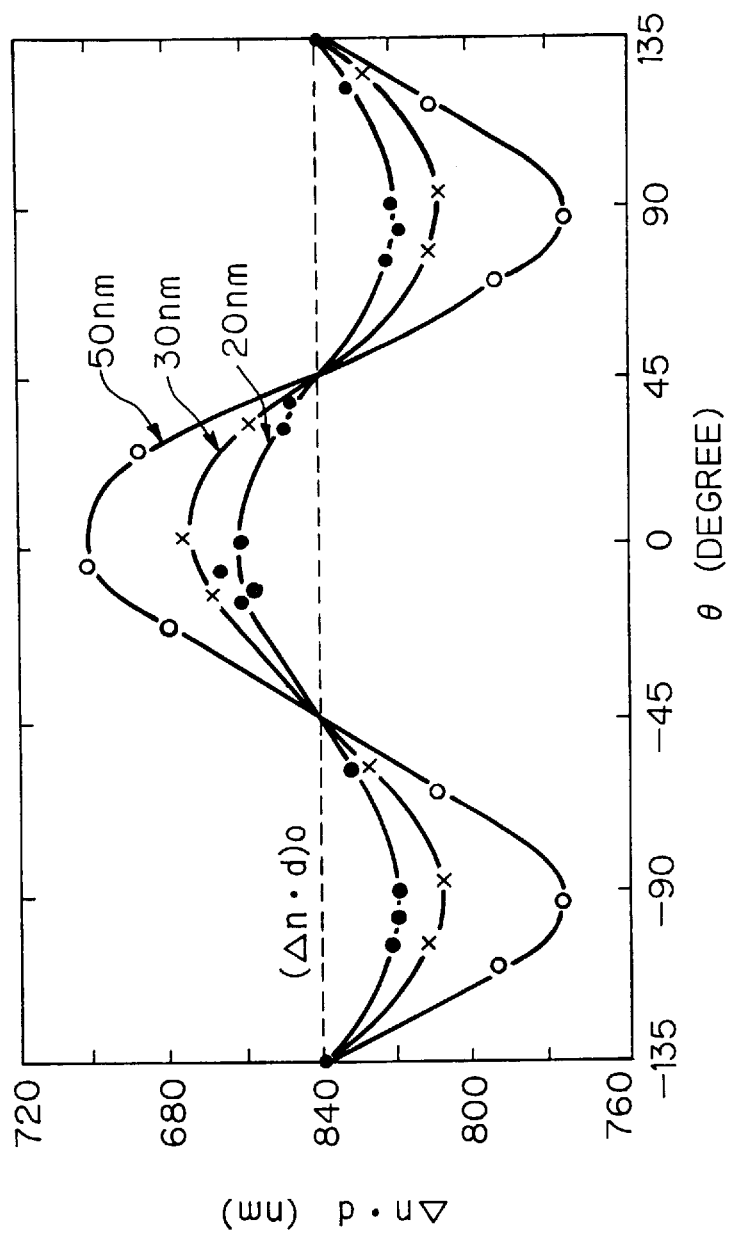
FIG. 5 is a graph showing the apparent θ-dependency of Δn.d as measured by rotating the film in the substrate surface.

Similarly, FIG. 5 shows the apparent θ-dependability of Δn.d measured by rotating the film in the surface of the substrate in cases where the film retardation is 20 nm, 30 nm, and 50 nm. When the angle θ has a certain width, e.g. when θ's center value of −45 degrees is compared with the other cases of θ's center values −0 degrees and 90 degrees, it is apparent that the variation width of Δn.d in the cases of 0 degrees and 90 degrees is smaller than that in the case of 45 degrees. For example, in the case of 90 degrees, the variation width of θ is almost half.

In general, in order to provide optimum results it is necessary to suppress the variation of Δn.d in the liquid crystal layer to a value not larger than 20 nm, preferably not larger than 10 nm. When the value of the film retardation exceeds 50 nm, the variation of Δn.d in the liquid crystal layer may also exceed 20 nm. This is not preferred.

Certain embodiments of the present invention will now be further explained. The film structure preferred in the present invention is that in which gas barrier films and solution-proof hard-coat films are formed on both surfaces of a non-expandable polycarbonate film of 125 μm thickness, and transparent conductive ITO films of about 130 nm thickness are formed on one surface thereof by use of a low-temperature sputtering method.

Figure 6:
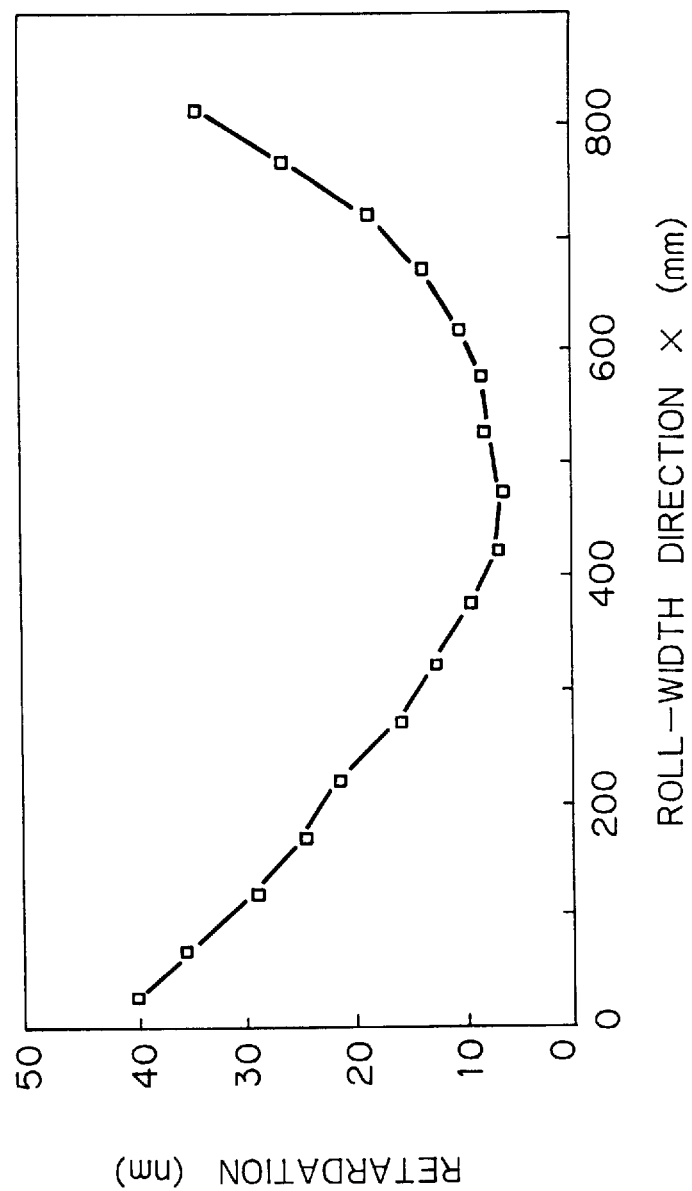
FIG. 6 is a graph showing the distribution of retardation on the film substrate in the direction of the roll axis.
Figure 7:
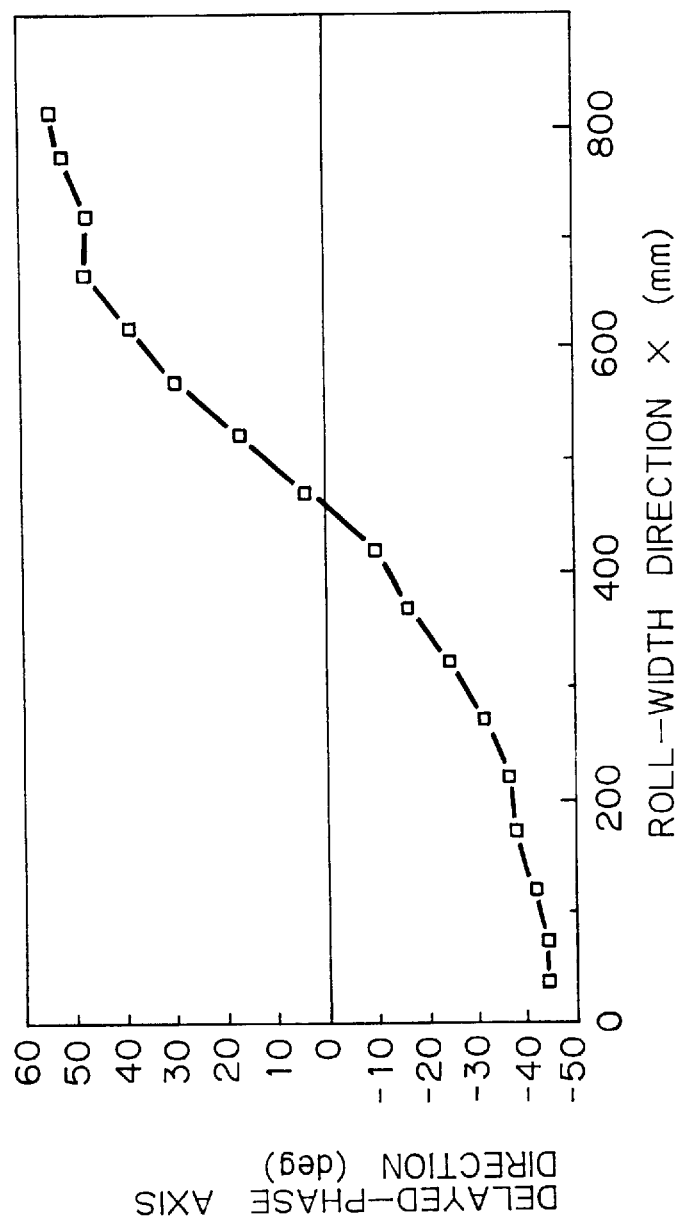
FIG. 7 is a graph showing the distribution of the retardation on the film substrate in the roll axis direction of the delayed-phase axis.
Figure 8:
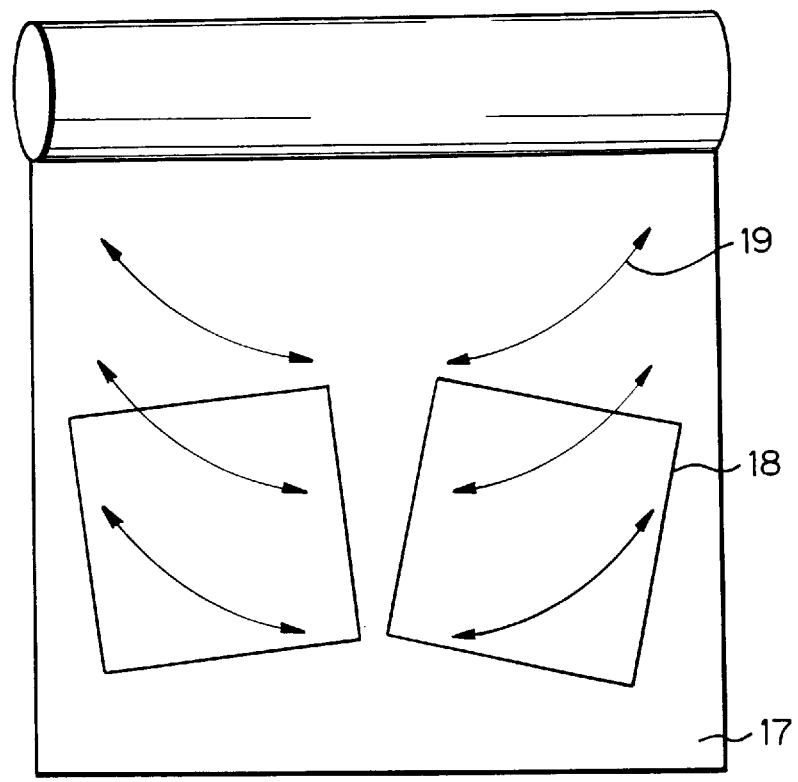
FIG. 8 shows the cutting-down of the film.

The distribution of retardation in the roll width direction of this substrate was measured by use of the automatic complex refraction measuring apparatus (ADR200B) made by ORC Manufacturing Co., Ltd. As a result of measuring the distribution, the magnitude of the retardation is shown in FIG. 6, and the direction of the delayed-phase axis is shown in FIG. 7 on the assumption that the counterclockwise direction is positive from the roll width direction. A substrate of 330 mm×330 mm is cut out from the roll film as shown in FIG. 8. The variation width thereof in the surface in the delayed-phase axis direction of the retardation in the surfaces of the respective substrates had been made about 45 degrees.

In cases where the substrate is employed in an STN-type liquid crystal display with a 240 degree twist, two sorts of substrate are prepared; a substrate in which the average delayed phase axis of the substrate retardation is parallel with the rubbing direction and another substrate in which the same is perpendicular thereto. After forming an electrode pattern with photo-lithography by use of the above substrate, a direction distributing film made of polyimide resin is formed on the substrate, and further, after executing the rubbing treatment so as to make the twisting angle of the liquid crystal molecule equal to 240 degrees, the substrates are superposed on each other through spacers and seals of 6.1 μm such that the direction distributing processing surface is an internal side. The shape of the seal is 30 mm×90 mm and 24 pieces of cell can be made from a couple of cells. Liquid crystal material is injected into each cell made utilizing the vacuum injection method. After sealing the injection inlet with a UV hardened resin, the polarizing plate is added to the liquid crystal display element according to the present invention.

Regarding the delayed-phase axis direction and the rubbing direction, three combinations as mentioned below can be realized, by combining the upper substrate and the lower substrate;

(1) "Parallel"—"parallel"

(2) "Perpendicular"—"perpendicular"

and (3) "Parallel"—"perpendicular".

Although the respective color tones differ from each other between the above-mentioned combinations (1)–(3), there arose no problem in the unevenness of color and the unevenness of contrast concerning any of the three combinations (1)–(3). Furthermore, when liquid crystals of different $\Delta n$ are injected into and sealed in each of the cells, all three types of cells can be made to have similar color tone.

According to the first embodiment of the present invention, in the STN-type liquid crystal display element employing a couple of plastic films as substrates, the maximum value of the substrate's retardation is not larger than 50 nm. Furthermore, the delayed-phase axis direction varies in the surface of the substrate, and the average retardation of the delayed-phase axis direction of the retardation in the above-mentioned substrate surface is made almost parallel with or almost perpendicular to the direction of the orientation of the liquid crystal molecule in the front surface of the substrate. The functional effects that both extend the color unevenness and the contrast unevenness are small and the quality of color is made stable in the present embodiment described above. Furthermore, low cost and excellent productivity are provided.

In the second embodiment of the present invention, since the value $\Delta n.d$ of the liquid crystal layer is adjusted by the magnitude of the plastic film substrate retardation so as to obtain an optimum value, even though there exists retardation in the film, the retardation does not exert any influence, seemingly, on the display characteristics of the invention liquid crystal display element.

In the third embodiment of the present invention, since the average delayed-phase axis direction of the retardation in the substrate surface of one of the plastic film substrates is almost parallel with the direction of the orientation of the liquid crystal molecules in the above-mentioned substrate's front surface, the influence exerted by the substrate retardation is canceled by the upper and lower substrates, and thereby the value $\Delta n.d$ of the liquid crystal layer seemingly does not vary. Consequently, the retardation of the substrate can be ignored. Furthermore, it is not necessary to change the value $\Delta n.d$ of the liquid crystal layer in accordance with the retardation value of the substrate, and the resulting productivity thereof is excellent.

In the fourth embodiment of the present inventions the variation area of the delayed-phase axis direction of the plastic film substrate retardation is set within about 45 degrees in the surface of the liquid crystal display element. With such construction, the present embodiment has the functional effect of increasing the upper limit of the substrate retardation while avoiding color unevenness and contrast unevenness.

In the fifth embodiment of the present invention, the variation area of the plastic film substrate retardation magnitude is set not larger than 20 nm, preferably, not larger than 10 nm, in the surface of the liquid crystal display element. In such construction, the present embodiment demonstrates the functional effect that the color unevenness and the contrast unevenness of the liquid crystal element can be reduced.

Furthermore, according to the present invention, the phase-difference plate for use in color compensation may be disposed on at least one side between the plastic film substrate and the polarizing element. In this manner, it is possible to realize the achromatic and well-recognizable liquid crystal element. Assuming that the phase difference plate is disposed such that the delayed phase axis direction thereof may become almost perpendicular to the direction of the orientation of the liquid crystal molecules on the inner surface of the adjacent substrates, one can simply increase or decrease the retardation value of the phase-difference plate for compensating color. This aspect of the present invention is particularly beneficial.

Furthermore, according to the present invention, a phase-difference plate for use in color compensation and another phase-difference plate for use in visual-field angle compensation can be disposed on at least one side between the plastic film substrate and the polarizing element. In such a configuration it is possible to realize a liquid crystal element having a wide visual field. This aspect of the present invention is also particularly beneficial. Also useful are display devices utilizing only one substrate having the above-described properties (retardation, delayed phase axis direction, etc.).

This application is based on Japanese application P5-225194 filed Aug. 17, 1993, incorporated herein in its entirety.

The present invention has now been described. Obviously, numerous modifications are apparant to the routineer in this art, and the present invention is not to be limited to the specific embociments provided herein.

What is claimed as new and is desired to be secured by Letters Patent of the United States is:

1. A liquid crystal display element containing a couple of plastic films having a transparent electrode and alignment controlling film both formed thereon as substrates and including therein at least one sheet of phase difference plate for compensating color, wherein the principle optical axes direction of said substrates are, respectively, within the range of $\mp 45°$ from the direction parallel with or perpendicular to the direction of the orientation of liquid crystal molecule on the front surface of said substrate, wherein in connection with the product value $\Delta n.d$ or birefringent refractive index $\Delta n$ and the thickness d of the liquid crystal layer, assuming that the optimum value of said product value for obtaining best displaying characteristic is $(\Delta n.d)_0$ when no retardation exists on said substrate and the magnitudes of said substrate retardation are, respectively, set to R1 and R2, in case that the average delayed-phase axis directions of said substrate retardation are, respectively, almost parallel with a direction of the orientation of said liquid crystal molecule and the front surface of said substrate, the following equality is established:

$$\Delta n.d = (\Delta n.d)_0 - R1 - R2$$

and wherein, in the same situation, where the average delayed-phase axis directions of said substrate retardation are, respectively, almost perpendicular to the direction of the orientation of the liquid crystal molecule on the front surface of said substrate, the following equality is established:

$$\Delta n.d = (\Delta n.d)_0 + R1 + R2.$$

2. The liquid crystal display element of claim 1, wherein said liquid crystal display element is black-and-white super twisted nematic.

3. The liquid crystal display element of claim 1, wherein the optical axis direction of either one of said substrates is within the range of $\mp 45°$ from the direction parallel with the orientating direction of liquid crystal molecule on the front surface of said substrate, and wherein the optical axis direction of another one of said substrates is within the range of $\mp 45°$ from the direction perpendicular to the orientating direction of liquid crystal molecule on the front surface of said substrate.

4. The liquid crystal display element of claim 1, wherein the variation area of said principal optical axes direction of said respective substrates is within the range of 45° on the surface of said liquid crystal display element.

5. The liquid crystal display element of claim 1, wherein the variation width of the retardation values of said respective substrates is not larger than 20 nm on the surface of said liquid crystal display element.

6. A liquid crystal display element, comprising a couple of plastic films, each having a transparent electrode and alignment controlling film both formed thereon as substrates, and including therein at least one sheet of phase-difference plate for compensating color, wherein both retardation values on the surface of said couple of plastic films is not larger than 50 nm, and wherein principal optical axes directions of said substrates are, respectively, within the range of ±45° from a direction parallel with or perpendicular to a direction of orientation of liquid crystal molecule on a front surface of said substrate, wherein product value $\Delta n.d$ of a birefringent refractive index $\Delta n$ and a thickness d of a liquid crystal layer, assuming that the optimum value of said product value for obtaining an optimum display characteristic is $(\Delta.d)_0$ when no retardation exists on said substrate and the magnitudes of said substrate retardation are, respectively, set to R1 and R2, where the average delayed-phase axes directions of said substrate retardation are, respectively, almost parallel with the direction of the orientation of said liquid crystal molecule on a front surface of said substrate, the following equality is established:

$$\Delta n.d = (\Delta n.d)_0 - R1 - R2,$$

and wherein, when the average delayed-phase axes directions of said substrate retardation are, respectively, almost perpendicular to the direction of the orientation of the liquid crystal molecule on a front surface of said substrate, the following equality is established:

$$\Delta n.d = (\Delta n.d)_0 + R1 + R2.$$

7. The liquid crystal display element of claim 6, wherein the optical axis direction of either one of said substrates is within the range of ±45° from the direction parallel with the orienting direction of liquid crystal molecule on the front surface of said substrate, and wherein the optical axis direction of another one of said substrates is within the range of ±45° from the direction perpendicular to the oriented direction of liquid crystal molecule on the front surface of said substrate.

8. The liquid crystal display element of claim 6, wherein the variations area of said principal optical axes direction of said respective substrates is within the range of 45° on the surface of said liquid crystal display element.

9. The liquid crystal display element of claim 6, wherein the variation width of the retardation values of said respective substrates is not larger than 20 mn on the surface of said liquid crystal display element.

10. The liquid crystal display element of claim 6, wherein said liquid crystal display element is black-and-white super twisted nematic.

11. A liquid crystal display element in which an alignment layer is formed on a couple of plastic film substrates having transparent electrodes, said couple of substrates being bonded to each other through a spacer and a seal so as to obtain a predetermined cell gap, which is a thickness of liquid crystal layer, wherein a couple of polarizing plates are stuck on the outside of liquid crystal cell made by sealing an injection opening after injecting liquid crystal, wherein, in connection with the product value $\Delta n.d$ of birefringent refractive index $\Delta n$ and the thickness d of the liquid crystal layer, assuming that the optimum value of said product value for obtaining best displaying characteristic is $(\Delta n.d)_0$ when any retardation does not exist on said substrate and the magnitudes of said substrate retardation are respectively set to R1 and R2, in case that the average delayed-phase axis directions of said substrate retardation are, respectively, almost parallel with the direction of the orientation of said liquid crystal molecule on the front surface of said substrate, the following equality is established:

$$\Delta n.d = (\Delta n.d)_0 - R1 - R2,$$

and wherein, in the same situation, in case that the average delayed-phase axis directions of said substrate retardation are, respectively, almost perpendicular to the direction of the orientation of the liquid crystal molecule on the front surface of said substrate, the following equality is established:

$$\Delta n.d = (\Delta n.d)_0 + R1 + R2.$$

12. The liquid crystal display element of claim 11, wherein a retardation film is inserted between a polarizing element and a substrate for performing black-and-white display.

13. The liquid crystal display element of claim 12, wherein said liquid crystal display element for black-and-white display is super twisted nematic.

14. A liquid crystal display element, comprising a couple of plastic films having a transparent electrode, alignment film and retardation film, all formed thereon as a substrate, and including therein at least one sheet of phase-difference plate for compensating color, wherein the maximum value of the retardation values on the surface of said couple of plastic films is not layer than 50 nm, and wherein the principle optical axes direction of the substrates are, respectively, within the range of ±45° from the direction parallel with or perpendicular to the direction of the orientation of liquid crystal molecule on the front surface of the substrate, and wherein said retardation film is inserted between a polarizing element and a substrate for performing black-and-white display, and wherein the optical axis direction of either one of said substrates is within the range of ±45° from the direction parallel with the orientating direction of liquid crystal molecule on the front surface of said substrate, and wherein the optical axis direction of another one of said substrates is within the range of ±45° from the direction perpendicular to the orientating direction of liquid crystal molecule on the front surface of said substrate.

15. The liquid crystal display element of claim 12, wherein the area of the variation area of said principle optical axis direction of said respective substrates is within the range of 45° on the surface of said liquid crystal display element.

16. The liquid crystal display element of claim 14, wherein the variation width of the retardation values of said respective substrates is not larger than 20 nm on the surface of said liquid crystal display element.

* * * * *